United States Patent [19]

Crisler

[11] 3,919,274

[45] Nov. 11, 1975

[54] NONAQUEOUS METHOD FOR DISSOLVING LANTHANIDE AND ACTINIDE METALS

[75] Inventor: Larry R. Crisler, Arvada, Colo.

[73] Assignee: The United States of America as represented by the United States Energy Research and Development Administration, Washington, D.C.

[22] Filed: Aug. 23, 1974

[21] Appl. No.: 499,960

[52] U.S. Cl............................ 260/429.1; 260/429.2
[51] Int. Cl.² ............................................. C07F 5/00
[58] Field of Search..................... 260/429.1, 429.2

[56] References Cited
UNITED STATES PATENTS

| | | | |
|---|---|---|---|
| 2,149,856 | 3/1939 | McKone et al. | 260/429.1 |
| 2,197,498 | 4/1940 | Guthmann | 260/429.1 |
| 2,632,763 | 3/1953 | Hagemann | 260/429.1 |
| 2,989,556 | 6/1961 | Dixon et al. | 260/429.1 |
| 3,254,103 | 5/1966 | Melby et al. | 260/429.2 |
| 3,700,416 | 10/1972 | Lucid | 423/8 X |

FOREIGN PATENTS OR APPLICATIONS

| | | | |
|---|---|---|---|
| 895,676 | 5/1962 | United Kingdom | 260/429.1 |

OTHER PUBLICATIONS

Moeller et al., Journal of Inorganic and Nuclear Chemistry, Vol. 2, No. 3, Mar., 1956, pp. 164–175.

*Primary Examiner*—Benjamin R. Padgett
*Assistant Examiner*—Christine M. Nucker
*Attorney, Agent, or Firm*—Dean E. Carlson; Dudley W. King; Ignacio Resendez

[57] ABSTRACT

Lanthanide and actinide beta-diketonate complex molecular compounds are produced by reacting a beta-diketone compound with a lanthanide or actinide element in the elemental metallic state in a mixture of carbon tetrachloride and methanol.

10 Claims, No Drawings

NONAQUEOUS METHOD FOR DISSOLVING LANTHANIDE AND ACTINIDE METALS

BACKGROUND OF INVENTION

The invention relates to a nonaqueous method for dissolving lanthanide and actinide metals and producing lanthanide and actinide beta ($\beta$)-diketonate complex molecular compounds respectively.

Methods for separating and recovering lanthanide or actinide materials from mixtures of other materials are constantly being sought. As an example, it is desirable to separate plutonium from other materials and thereafter recover the plutonium, such as in recovering plutonium in the casting process of plutonium in tantalum crucibles, or from metal machining operations.

Nonaqueous methods for making lanthanide or actinide $\beta$-diketonate complex molecular compounds are also desirable wherever the product is used in isotopic separations by way of volatile methods, chemical vapor deposition processes, and other like processes.

Thus a method for reacting and recovering lanthanide and actinide materials from a mixture of materials would find ready application in industrial manufacturing and recovery processes where these mixtures may be found.

SUMMARY OF INVENTION

In view of the above, it is an object of this invention to provide an improved method for recovering lanthanide and actinide elements from mixtures of materials wherein the lanthanide or actinide metal is reacted with a suitable $\beta$-diketone compound in a carbon tetrachloride ($CCl_4$) and anhydrous methanol ($CH_3OH$) mixture to form a lanthanide or an actinide $\beta$-diketonate complex molecular compound.

It is a further object of this invention to provide a novel method using organic materials for rapidly dissolving lanthanide and actinide metals.

It is a further object of this invention to provide a novel method for forming nonhydrated lanthanide or actinide $\beta$-diketonate complex molecular compounds.

It is a further object of this invention to provide a novel method using organic materials for forming plutonium (IV) $\beta$-diketonate complex molecular compounds in a one step process.

It is a further object of this invention to provide a novel method for forming tris(2,4-pentanedionato)-plutonium (IV) chloride.

It is a further object of this invention to provide a novel method for forming nonhydrated tris(2,4-pentanedionato)samarium (III).

It is a further object of this invention to provide a novel method for forming tetrakis(1,1,1,2,2,3,3-heptafluoro-7,7-dimethyl-4,6-octanedionato)-uranium (IV).

Various other objects and advantages will appear from the following description of this invention and the most novel features will be particularly pointed out hereinafter in connection with the appended claims. It will be understood that various changes in the details, materials and steps of the process, which are herein described and illustrated in order to explain the nature of the invention, may be effected by those skilled in the art without departing from the scope of this invention.

The invention comprises, in brief, contacting a lanthanide or actinide metal in the elemental state with a suitable $\beta$-diketone compound (i.e., a compound containing beta-carbonyl groups with at least one proton on the carbon separating the carbonyl groups, thus allowing a keto $\rightleftharpoons$ enol tautomerism to occur, and, under appropriate conditions, the enolic proton may be removed) having the formula $R'C(:O)CH_2C(:O)R''$ where $R'$ and $R''$ are alkyl, fluorinated alkyl, aromatic and/or heterocyclic groups, in a mixture of $CCl_4$ and $CH_3OH$ to dissolve the metal and form a lanthanide or actinide $\beta$-diketonate complex molecular compound. Reaction may be aided by heating to from about 20°C to about 51°C.

DETAILED DESCRIPTION

The nonaqueous method of making lanthanide or actinide $\beta$-diketonate or $\beta$-ketoenolate complex molecular compounds wherein water is not used as a solvent is illustrated by equations 1, 2 and 3 in which samarium is used as the representative lanthanide and plutonium and uranium as representative actinide materials and in which 2,4 pentanedione (otherwise referred to as acetylacetone of HAcAc) and 1,1,1,2,2,3,3-heptafluro-7,7-dimethyl-4,6-octanedione (otherwise referred to as Hfod) are the representative $\beta$-diketone compounds. The reactions were conducted at temperatures of from about 20°C to about 51°C (the approximate boiling point of the reaction mixture).

The equations used herein are believed to accurately represent the reactions occurring although exact stoichiometric quantities have not been verified. The products have all been verified by mass spectral analysis.

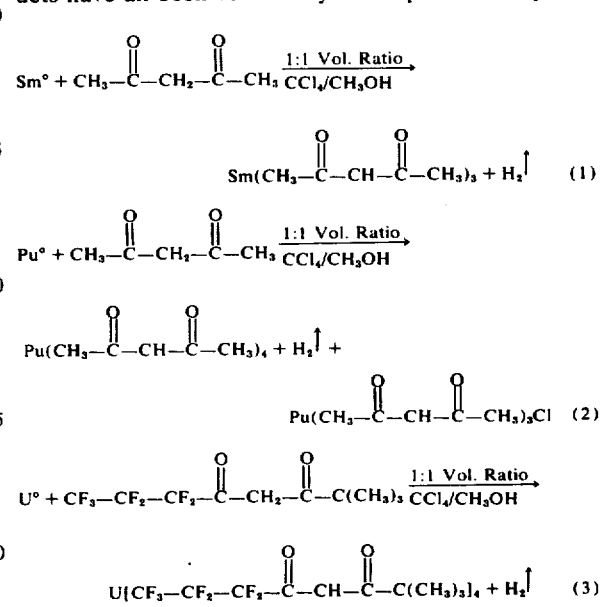

In equation 1, the first product, tris(2,4-pentanedionato)samarium (III) (for convenience referred to hereinafter as Sm(AcAc)$_3$) comprises about 100 percent of the reaction products. In equation 2, the first product, tetrakis(2,4-pentanedionato)plutonium (IV), (for convenience referred to hereinafter as Pu(AcAc)$_4$) comprises about 75 percent of the reaction product and the product tris(2,4-pentanedionato)-plutonium (IV)chloride (for convenience referred to hereinafter as Pu(AcAc)$_3$Cl, is found only in amounts such as about 25 percent. In equation 3, tetrakis(1,1,1,-2,2,3,3-heptafluoro-7,7-dimethyl-4,6-octanedionato)uranium (IV) (for convenience referred to hereinafter as U(fod)$_4$), comprises about 95 percent of the reaction product. Hydrogen evolves as a gas in these reactions which may be recovered or captured, if such is desired.

The resulting products may be purified by sublimation; Sm(AcAc)$_3$ at a temperature of from about 250°C to about 300°C, Pu(AcAc)$_4$ at a temperature of from about 135°C to about 180°C, and U(fod)$_4$ at from about 150°C to about 200°C. The pressure for sublimation may be from about $10^{-4}$ to about $10^{-6}$ torr. The sublimed Sm(AcAc)$_3$ and U(fod)$_4$ may have greater than about 99 percent purity. The sublimed Pu(AcAc)$_4$ may have about 75% purity with about 25 percent Pu(AcAc)$_3$Cl present. These reactions yielded nonhydrated products since the method of preparation was nonaqueous.

An alternate method for purifying the metal β-diketonate or β-ketoenolate products represented in equations 1, 2 and 3, using the plutonium products Pu(AcAc)$_4$ and Pu(AcAc)$_3$Cl as representative of this group, may comprise dissolving these products in an organic solvent such as chloroform, dichloromethane, or benzene and removing the insoluble materials by a suitable separation method such as filtration. The Pu(AcAc)$_4$ and Pu(AcAc)$_3$Cl will remain in the organic solvent, which solvent may thereafter be removed by evaporation, such as at a temperature of from about 20°C to about 80°C, at a pressure of from about 20 to about 760 torr to yield mixed Pu(AcAc)$_4$ and Pu(AcAc)$_3$Cl.

It should be understood that other lanthanide and actinide materials as well as other β-diketone compounds perform in a similar manner. For example, uranium and cerium, when reacted with HAcAc, likewise yields tetrakis(2,4-pentanedionato)uranium (IV) or tetrakis(2,4-pentanedionato) cerium (IV) product, respectively, as shown by equations 4 and 5. These may subsequently be purified in similar fashion as described above.

Sm(AcAc)$_3$ as verified by melting point analysis (100°–105°C), and mass spectral analysis.

EXAMPLE II

A plutonium metal coupon weighing about 0.5 gram is placed in a one to one volume mixture of CCl$_4$ and CH$_3$OH (5 ml of each) to which 0.8 grams of a β-diketone compound, HAcAc has been added. The reaction is conducted in an argon atmosphere at less than about 0.5% oxygen concentration at ambient temperature, i.e., about 25°C., and about 600 torr pressure. A reaction is observed in place after about 0.5 minutes with hydrogen being evolved. The solution turns from a clear color to a red brown color. Analysis of the products verifies those products shown in equation 2. The reaction is complete in about one hour.

EXAMPLE III

A uranium metal coupon weighing about 3.247 grams is placed in 40 ml of a one to one volume mixture of CCl$_4$ and CH$_3$OH containing 16.11 grams of Hfod. The reaction is conducted in an argon atmosphere at less than about 0.5% oxygen concentration at ambient temperature, i.e., about 25°C., and about 600 torr pressure. The reaction initiates immediately and is complete in about 5 hours. The reaction product atmosphere is evacuated to about one torr to remove excess CCl$_4$ and CH$_3$OH. The dark brown-green solid is dissolved in anhydrous CH$_3$OH and allowed to recrystallize at ambient temperature. The yield is about 95% U(fod)$_4$ as verified by melting point analysis (145°–149°C) and mass spectral analysis.

EXAMPLE IV

One application of this invention is that of separating plutonium from other materials such as the tantalum

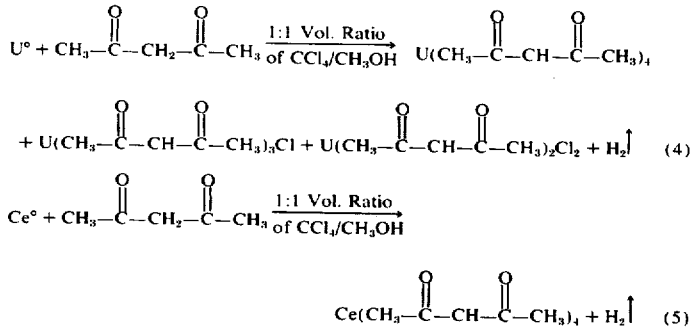

EXAMPLE I

One gram of Samarium metal turnings is placed in about 2 milliliters (ml) of a β-diketone compound HAcAc and 2 ml of one to one volume mixture of CCl$_4$ and CH$_3$OH is added drop-wise with stirring. The reaction may be conducted in an argon atmosphere at less than about 0.5% oxygen concentration at ambient temperature, i.e., about 25°C, and about 600 torr pressure. The reaction initiated immediately and is complete in about 10–15 minutes as noted by no further gas evolution. The reaction product's atmosphere is evacuated to about 1 torr to remove excess CCl$_4$, CH$_3$OH, and HAcAc. The light red-brown solid is dissolved in about 10 ml anhydrous dichloromethane (CH$_2$Cl$_2$) and purified by recrystallization. The yield is about 100% crucibles in which plutonium metal is cast. The mixture of the plutonium and tantalum is contacted with an excess of a suitable β-diketone compound such as HAcAc in an about 1:1 volume ratio of CCl$_4$/CH$_3$OH to form Pu(AcAc)$_4$ and Pu(AcAc)$_3$Cl, which may then be purified by subliming at a temperature of about 135°C and a pressure of about $10^{-4}$ torr to form a mixture of Pu(AcAc)$_4$ and Pu(AcAc)$_3$Cl or, in an alternate method, the products of the previous reaction may be dissolved in suitable organic solvents such as chloroform, dichloromethane, or benzene and the Pu(AcAc)$_4$ and Pu(AcAc)$_3$Cl which is in solution may be separated from insoluble materials by filtration. The solvent may then be removed by evaporation at a temperature of about 25°C to about 80°C and, if desired, at a reduced pressure to aid evaporation, to form a mixture of Pu(AcAc)₄ and Pu(AcAc)₃Cl.

Nonhydrated plutonium β-diketonate complex molecular compounds as well as other actinide and lanthanide β-diketonate complex molecular compounds formed by this process are useful in such processes as isotopic separation or enrichment by means of volatile techniques, chemical vapor deposition of oxide or metallic films, organic solvent soluble compounds for nonaqueous, electrochemical and associated processes, and the like. For these, anhydrous compounds generally perform more adequately than hydrated compounds because of increased solubility in organic solvents and improved volatility process properties.

Other β-diketone compounds which have been found to operate satisfactorily are such as 2-thenoyltrifluoroacetone. Although a one to one volume mixture of CCl₄/CH₃OH is used and referred to herein, the ratio may be changed from about 0.1 to about 9 parts by volume of CCl₄ to 1 part by volume CH₃OH. Further, other materials which are useable in lieu of CCl₄ portion are such as bromotrichloromethane, and trichloroacetonitrile. Other materials which are useable in lieu of CH₃OH are such as ethanol and isopropanol.

Actinide series elements as discussed herein include elements 89 through 103 in the periodic table of the elements. Lanthanide series elements as discussed herein include elements 57 through 71 in the periodic table of the elements as given in *Handbook of Chemistry and Physics*, 54th Edition, 1973, CRC Press, Cleveland, Ohio.

What is claimed is:

1. A method of dissolving elemental lanthanide and actinide metals and forming metal β-diketonate complex molecular compounds using nonaqueous reactants comprising contacting at least one of said metals with a β-diketone compound selected from the group consisting of 2,4-pentandione; 1,1,1,2,2,3,3-heptafluoro-7,7-dimethyl-4,6-octanedione; and 2-thenoyltrifluoroacetone in a mixture of carbon tetrachloride and methanol thereby dissolving said at least one of said elemental metals to yield a said one of said metals β-diketonate complex molecular compound.

2. The method of claim 1 wherein said metals are selected from the group consisting of samarium, plutonium, cerium and uranium.

3. The method of claim 1 wherein said carbon tetrachloride and methanol mixture is at a volume ratio of from about 1 to about 9 parts by volume of carbon tetrachloride to from about 9 to about 1 parts by volume of methanol, respectively.

4. The method of claim 1 wherein said carbon tetrachloride and methanol mixture is at an about 1 part by volume carbon tetrachloride to about 1 part by volume methanol ratio, and said β-diketone compound is 2,4-pentanedione.

5. The method of claim 4 wherein said at least one of said metals is samarium and said compound is tris(2,4-pentanedionato)samarium (IV).

6. The method of claim 4 wherein said at least one of said metals is plutonium and said compound is largely tetrakis(2,4-pentanedionato)-plutonium (IV).

7. The method of claim 4 wherein said at least one of said metals is uranium and said compound is tetrakis(2,4-pentanedionato)uranium (IV).

8. The method of claim 4 wherein said at least one of said metals is cerium and said compound is tetrakis(2,4-pentanedionato)cerium (IV).

9. The method of claim 1 including the further step of purifying said metal β-diketonate complex molecular compound by heating to a temperature of from about 135° to about 200°C at a pressure of from about $10^{-4}$ to about $10^{-6}$ torr to sublime and thereby purify said metal β-diketonate complex molecular compound.

10. The method of claim 1 including the further step of purifying said metal β-diketonate complex molecular compound by dissolving said compound in an organic solvent selected from the group consisting of chloroform, dichloromethane, and benzene, separating insoluble material, heating to evaporate and remove said solvent yielding said purified metal β-diketonate complex molecular compound.

* * * * *